Figure 1:
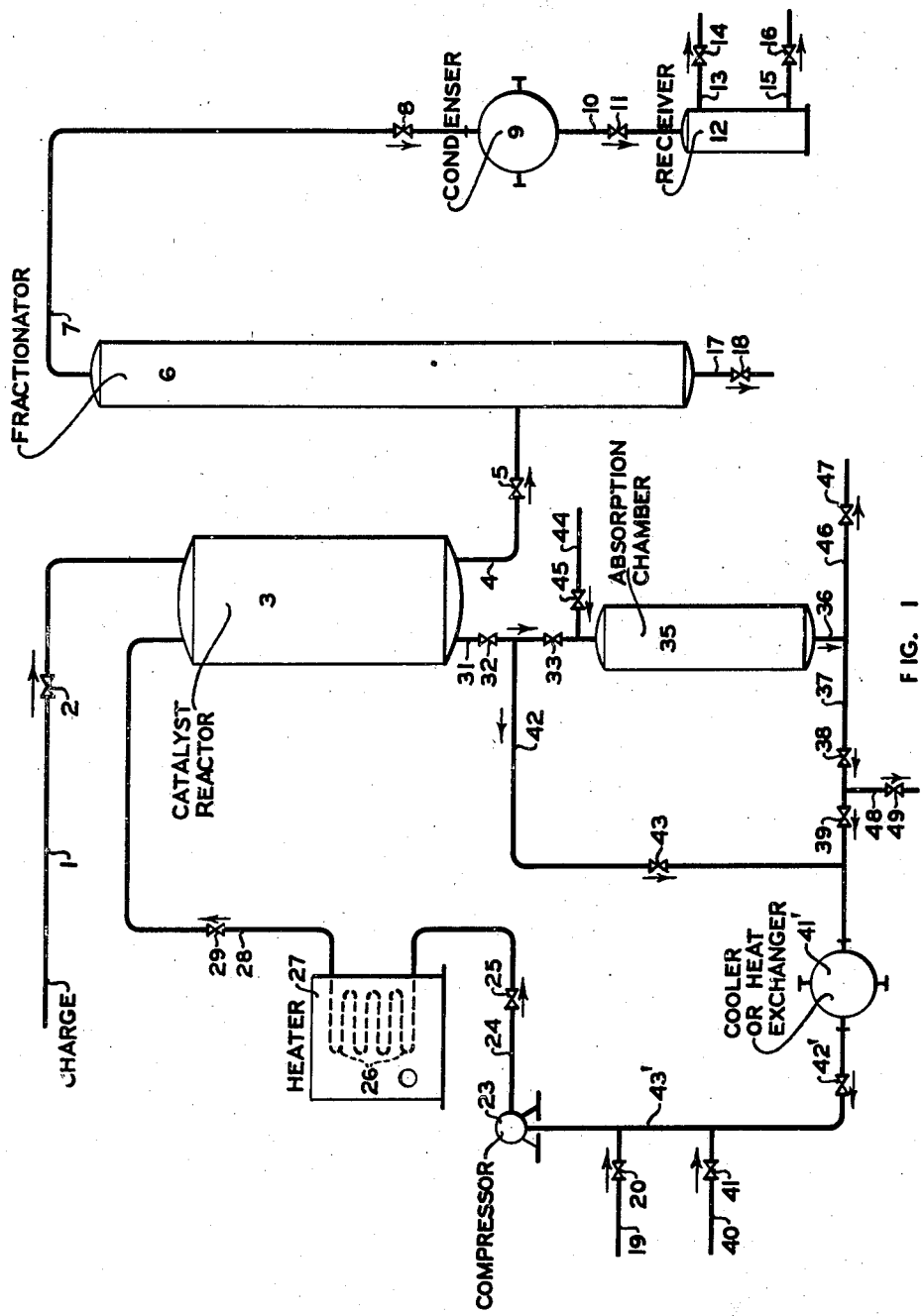

Patented Aug. 11, 1942

2,292,699

UNITED STATES PATENT OFFICE 2,292,699

REGENERATION OF CATALYTIC MASSES

Louis S. Kassel, Chicago, Ill., assignor to Universal Oil Products Company, Chicago, Ill., a corporation of Delaware Application July 26, 1941, Serial No. 404,104

6 Claims. (Cl. 196—52)

This invention relates to the catalytic conversion of hydrocarbons and more particularly to a method of regenerating carbonized catalytic masses.

In most of the catalytic hydrocarbon conversion reactions in which liquid or vaporous hydrocarbons are passed over a stationary bed of granular catalyst or other solid catalytic material the catalyst tends to decline in activity after certain periods of on-stream time. This decline in activity is a result of an accumulated deposit of carbonaceous or hydrocarbonaceous material on the surface of the catalyst and it becomes necessary to regenerate the catalyst at periodic intervals in order to maintain an efficient conversion level.

It is with improvements in methods of regenerating carbonized catalysts from catalytic conversion processes that my invention is concerned.

As will be developed hereinafter in this specification, the object of my invention is to obviate a difficulty commonly experienced in regenerating systems wherein the carbonized catalyst is regenerated in situ in the presence of an oxygen-containing gas and the effluent gases from the regeneration zone are recirculated.

In one specific embodiment my invention comprises an improvement in the method of regenerating a body of carbonized catalyst material wherein said carbonized catalytic material is subjected to contact with an oxygen-containing gas in a regenerating zone, a major portion of the effluent gases from said regenerating zone is mixed with a minor portion of an oxygen-containing gas, and the mixture is recirculated to the inlet of said regenerating zone, said improvement comprising the step of introducing the effluent gases from said regenerating zone into an absorption zone containing thermally stable and relatively inert absorptive material such as crushed firebrick, unglazed porcelain, crushed stone, absorptive clays, and similar substances, and adding said minor portion of oxygen-containing gas to the effluent gases from said regenerating zone prior to recirculation but after the passage of said effluent gases through said absorption zone.

In order to explain the advantages and utility of my method of regeneration it is necessary to examine in considerable detail the nature of the regeneration process as commonly carried out. In general, regeneration of carbonized catalysts has been accomplished in approximately the following manner. Immediately following the processing period the catalyst bed is purged with a stream of oxygen-free and relatively inert gas such as nitrogen, flue gas, or in certain cases, steam. This preliminary purging period is usually of only a few minutes duration and serves to sweep from the catalyst surface the more readily removed adsorbed hydrocarbons. To a slight extent, depending upon the temperature of the purge gas and the duration of the purge period, a distilling effect also occurs whereby some of the more strongly adsorbed hydrocarbons are removed from the catalyst interstices and swept from the reactor.

Following the purge period the regeneration proper is accomplished by passing through the reactor a stream of heated air or oxygen-containing gases which may be diluted with a relatively inert material such as flue gas mixture comprising nitrogen, etc. The carbonaceous or hydrocarbonaceous deposit on the catalyst is removed in at least two ways: (1) by a combined purging and distilling action whereby relatively heavy hydrocarbonaceous material is vaporized or otherwise swept from the catalyst, and (2) by actual burning of the deposit which is controlled by the oxygen content of the regenerating gas stream. The two effects may occur at the same time especially at different points in a catalyst bed. For example, when using a reactor of the type wherein the catalyst is maintained as a stationary bed and the regenerating gas mixture is passed downwardly through the bed, it may occur, especially at the beginning of a regenerating period, that when using controlled amounts of oxygen, such as one to two per cent, all the oxygen will be quickly consumed and burning of the catalyst deposit will occur only in the upper portion of the reactor. The hot, substantially oxygen-free gases, however, pass through the lower portion of the catalyst bed and volatilize or otherwise remove certain heavier hydrocarbons in the catalyst deposit. It is apparent, then, that this so-called distilling and purging effect which occurs along with combustion of the deposit is considerably more extensive because of the higher temperature and longer time than the similar effect that takes place during the preliminary purge period with oxygen-free gases.

As evidence that this effect is a relatively important one, I have observed in experimental catalytic cracking units that the effluent regenerating gases often have a smoky dark appearance indicating the presence of considerable unoxidized or partially oxidized material. In many cases, heavy liquid hydrocarbons have been separated from the effluent gases during the regeneration proper, and it is also common to find deposits of coke in the effluent regenerating gas lines which indicate that the heavy hydrocarbons from the catalyst deposit condensed on the cooler portions of the outlet lines and were eventually reduced to coke by the high temperature of the effluent gases at another time.

In certain catalystic conversion processes the nature of the hydrocarbonaceous material deposited on the catalyst is such that large amounts of heavy hydrocarbons are swept from the reactor in relatively unoxidized form as described above. If this material is recirculated through heaters, heat exchangers, compressors, coolers, etc., an objectionable gum-like or coke-like deposit is often left in lines, valves, and other points.

Moreover, if these heavy hydrocarbons are recirculated and introduced into the reactor with the regenerating gas stream, oxygen consumption will be materially increased and the regeneration will generally be made more difficult because the recirculated combustible hydrocarbons will now compete with the hydrocarbonaceous deposit for the available oxygen in the regenerating gas stream. In addition, the increased liberation of heat will complicate the problem of maintaining the degree of temperature control which is necessary to avoid damaging the catalyst or the material of construction of the reactor. Usually it is desirable to hold the maximum regeneration temperature below about 1300° F.

Obviously, it is advantageous to remove these volatilized hydrocarbons from the regenerating gas stream at some point between the discharge from the reactor and the point of introduction of the recirculated gases. By my method of operation the effluent gases from the regenerating zone are continuously passed through an adsorption zone wherein the volatilized heavy hydrocarbons are absorbed before recirculation in order to prevent objectionable gum or coke deposits in other parts of the system and in order to prevent said heavy hydrocarbons from being returned to the reactor and burned there with the liberation of heat.

The absorption zone or chamber is usually located immediately at the regenerating zone outlet, but it may be placed at any useful and convenient point in the recirculating system as hereinafter described. Air or other oxygen-containing gases are continuously admitted to the recirculating system at a point after the gases have passed through the absorption chamber. It is possible that in certain embodiments of my invention, combustion may take place in the absorption chamber at times when the effluent regenerating gases from the reactor have a sufficiently high temperature and oxygen concentration and when the concentration of combustible hydrocarbons in the absorption zone becomes sufficiently high. However, as will become evident hereafter in the discussion of Fig. 1 of the accompanying drawings, this is an undesirable condition which can be avoided by operating in the manner to be described.

It is within the scope of my invention to employ spent catalyst in the absorption chamber; i. e., catalyst which has been previously used in hydrocarbon conversion reactions or in other processes and whose activity has declined to an undesirable or uneconomical level. The siliceous or clay supported catalysts comprising silica, alumina or other components which are widely used in the cracking of hydrocarbon oils are well suited for the purposes of my invention, although of course there are many others equally well suited. It should be emphasized that I employ such spent catalysts merely for their physical absorptive properties.

Figure 2:
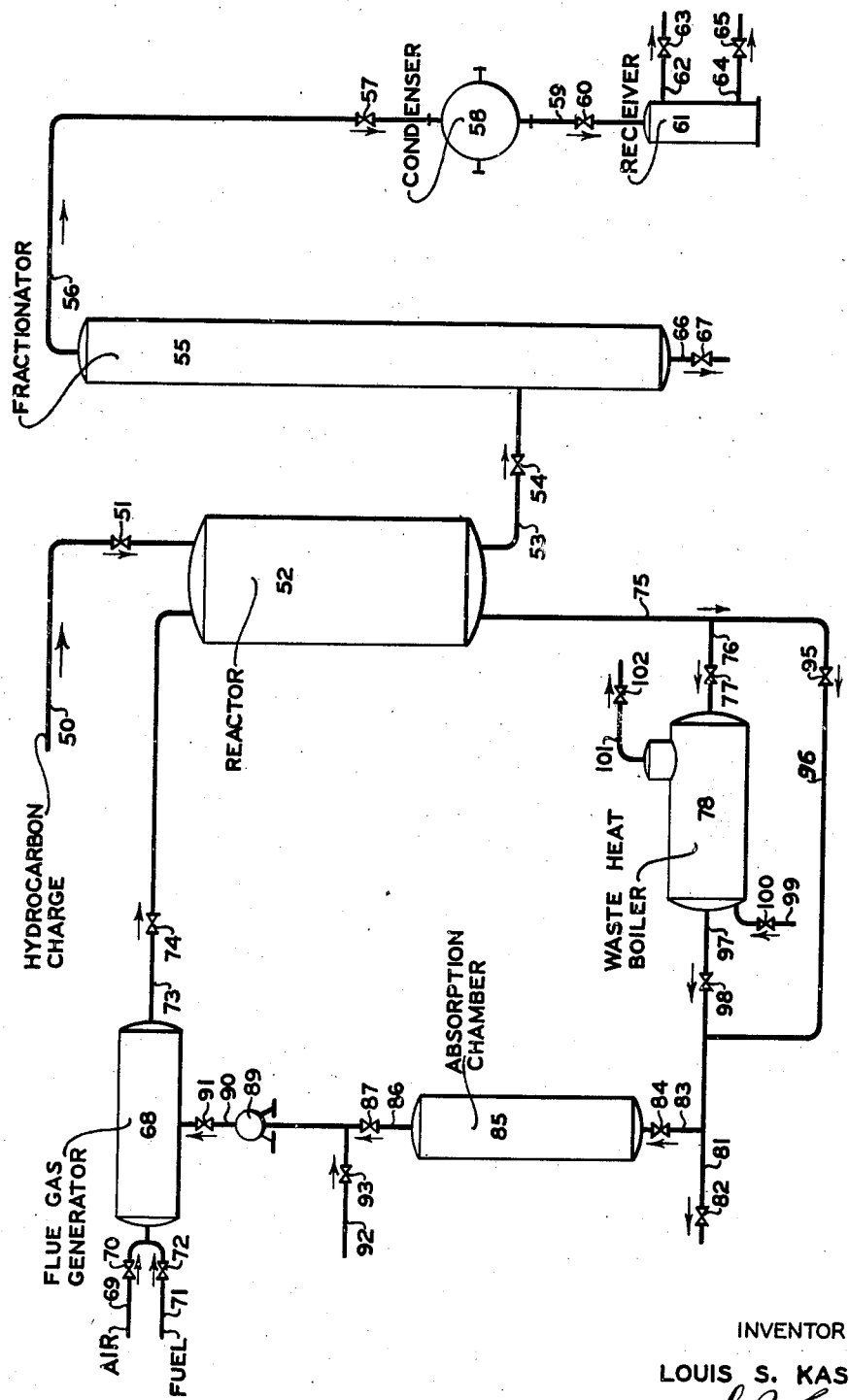

Fig. 1 of the accompanying drawings diagrammatically illustrates an arrangement of apparatus for carrying out one embodiment of the process of my invention, and Fig. 2 diagrammatically illustrates another arrangement of apparatus for carying out a modified embodiment of the process of my invention.

Referring to Fig. 1, the reference numeral 3 indicates a catalytic reactor of any well-known type in which catalyst is maintained as a solid continuous bed or in intermediate layers or in trays or in any other suitable manner. A vaporized or partially vaporized hydrocarbon charge is admitted to the reactor through line 1 and valve 2. The reaction products are removed from the reactor through line 4 and valve 5 and discharged into a fractionator 6, of the conventional type. Ordinarily a light gasoline-containing distillate is removed overhead through line 7 and valve 8 to condenser 9. The condensed distillate and non-condensable gases pass through line 10 and valve 11 to receiver 12. Pressure is ordinarily maintained on the system by withdrawing the non-condensable gases through line 13 and valve 14. The liquid product may be removed through line 15 and valve 16 for storage or for any further desired treatment. If desired, a portion of the liquid condensate may be returned to the top of fractionator 6 by means, not shown, to act as a refluxing agent.

Reflux condensate or other insufficiently converted material is removed from the fractionator through line 17 and valve 18. It is understood, of course, that this drawing is intended only to show the fundamentals of a catalytic conversion process of this type. Therefore, the ultimate disposal of a reflux condensate stream such as the one last referred to is not indicated. Ordinarily, however, such a stream might be recycled to another step in the process or used as charging material for another process or removed as a product of the present process. It is also understood that in such a system a plurality of reactors or catalytic convertors is preferred in order that the conversion reaction may be carried out without interruption, each reactor being subjected to alternate periods of processing and regeneration. For the sake of simplicity, however, only a single reactor has been shown in the drawings.

After the reactor has been on process for a suitable length of time the catalyst therein is regenerated by oxygen-containing regenerating gases which are admitted to the reactor through line 28 and valve 29. The products of the regeneration are removed from the reactor through line 31 and valve 32. They are then directed through valve 33 to absorption chamber 35 which is the feature of my invention. The heavy hydrocarbon materials which have been swept from the catalyst surface in relatively unoxidized form are absorbed in chamber 35 and the remaining gases are discharged from the chamber through lines 36 and 37 and valve 38. The discharged gases are directed through valve 39 to cooler or heat exchanger 41'. This apparatus may comprise any convenient system or design whereby heat may be removed from the hot gas stream in order to protect the compressor 23. Moreover, the heat recovered at this point represents an important economic saving. The cooled gases leave through valve 42' and pass by line 43' to compressor 23. The compressed gases are discharged through line 24 and valve 25 into heating coil 26 disposed in furnace 27. The heated gases then pass through line 28 and valve 29 and are thus recirculated to the inlet of reactor 3.

Controlled amounts of air or other oxygen-containing gases are introduced into the recirculating system through line 19 and valve 20. It is also necessary occasionally to supply relatively small amounts of flue gas or other oxygen-free regenerating gas through line 40 and valve 41 in order to compensate for leakage in the system. This extraneous addition of flue gas may also be necessary for purging purposes or when starting up a unit. Constant pressure is maintained in the regenerating system by means of vent line 48 and pressure control valve 49 through which gases are released corresponding to the addition of air to the system through line 19.

In certain cases it may occur that after a reactor has been on regeneration for a considerable period of time the oxygen content of the effluent regeneration gases will begin to build up because only a small amount of combustible material remains on the catalyst. As previously indicated, if the temperature of the gases and the concentration of absorbed hydrocarbons in the absorption chamber are sufficiently high, combustion may take place when these high oxygen content gases are introduced into the absorption zone. An obvious disadvantage would thereby result, namely, the fact that at least a portion of the absorbed hydrocarbonaceous material would be distilled or purged from the absorptive agent because of the heat of burning and the volatilized hydrocarbons would then be introduced into the recirculating system, thus counteracting in part the utility of the entire invention. This undesirable feature may be eliminated by closing valves 33 and 38 and by opening valve 43. Thus the effluent gases from reactor 3 pass through line 31 valve 32, line 42 and valve 43 and are then recirculated.

During the time near the end of the regeneration period when it is necessary to by-pass the absorption chamber, the absorptive material itself may be regenerated in a manner similar to the regeneration of the catalyst in reactor 3. This regeneration may be accomplished by introducing heated air through line 44, valve 45 into absorption chamber 35. The effluent gases from this regeneration are removed through lines 36 and 46 and valve 47 and usually vented to the atmosphere. If it is not desirable to regenerate the absorptive agent by burning off the absorbed hydrocarbons as just described, the material may be discarded and replaced with a fresh absorptive substance.

By alternately utilizing two or more absorption chambers in parallel it will be possible to regenerate the absorptive agent in each chamber relatively often. This will tend to prevent high concentrations of absorbed hydrocarbons in the absorption zone and thereby minimize the tendency toward combustion therein.

It should be realized that the desirability or necessity for by-passing the absorption chamber as shown in Fig. 1 will depend upon the regeneration characteristics of the catalyst and the catalyst deposit and upon the operating conditions under which the regeneration is carried out. For example, in the case of a catalytic cracking process utilizing silica-alumina or similar catalysts, I have observed that the method of manufacture of the catalyst has an important effect on its regeneration characteristics. Catalyst particles prepared by the mechanical extrusion of a precipitated gel tend to regenerate in such a manner that appreciable quantities of oxygen appear in the effluent regenerating gases a relatively short time after the regenerating period has begun. On the other hand, catalyst particles of the same composition, but prepared by a pilling operation involving mechanical compression of a powder, have entirely different regeneration characteristics. With this type of catalyst under certain conditions of pressure and moisture content of the regenerating gases it has been observed that the effluent regenerating gases are approximately oxygen-free during substantially the entire regeneration period.

Referring now to the embodiment of my invention illustrated in Fig. 2, the processing side of the plant is the same as shown in Fig. 1. The vaporized hydrocarbon charge enters reactor 52 through line 50 containing valve 51. The reaction products pass through line 53 and valve 54 into fractionator 55. An overhead distillate and non-condensable gases are removed through line 56 and valve 57 to condenser 58. The liquid condensate and uncondensed gases pass through line 59 and valve 60 into receiver 61 where the liquid product may be withdrawn by means of line 64 and valve 65 and the fixed gases may be released through line 62 and valve 63. A recycle stream of insufficiently converted material is removed through line 66 containing valve 67.

The regenerating system of this particular embodiment of my invention, however, involves somewhat different features than those shown in Fig. 1. In this case a flue gas generator or convertor 68 is maintained wherein air and fuel gas are mixed and burned in order to produce a continuous supply of regenerating gas. Air is introduced into the generator through line 69 containing valve 70 and fuel is introduced through line 71 containing valve 72. The regenerating gas which also contains controlled quantities of oxygen as described later passes through line 73 and valve 74 into reactor 52 where regeneration of the catalyst occurs.

In this case the effluent regenerating gases from the reactor do not pass directly into the absorption chamber as in Fig. 1. Instead, the gases are removed through line 75 and pass through line 76 containing valve 77 to a waste heat boiler 78. This boiler may be of any well-known construction whereby the hot combustion gases are used in the generation of steam. A portion of the heat content of the effluent regenerating gases may be thereby recovered in order to improve the overall economics of the process. Boiler feed water enters by line 99 and valve 100 and steam is removed through line 101 and valve 102. The outlet gases from the waste heat boiler pass through line 97 and valve 98. The temperature of the outlet gases from the waste heat boiler may be controlled within certain limits by by-passing a portion of the effluent regenerating gases from the reactor around the waste heat boiler. This is accomplished by means of line 96 containing valve 95. It should be realized that any well-known type of heat exchange equipment may be utilized in place of waste heat boiler 78.

The combined gaseous streams pass through line 83 containing valve 84 into absorption chamber 85. This chamber operates in the same manner as the absorption chamber of Fig. 1. However, in this case sufficient heat has been removed from the effluent regenerating gas stream by means of the waste heat boiler so that the temperature of the gases in the absorption chamber is too low to initiate combustion of the absorbed hydrocarbons therein. Thus, even if an appreciable quantity of oxygen is present in the effluent regenerating gases, no combustion will occur in the absorption zone because of the low temperature. This temperature will normally be in the range of 700 to 900° F.

The hydrocarbon-free regenerating gases leave the absorption chamber through line 86 and valve 87 and pass into the suction side of a compressor or blower 89 which serves to recirculate the gases. As previously indicated, excess air or other oxygen-containing gas is admitted to the system through line 92 and valve 93 at the suction side of the compressor or blower. It can be seen that absorption chamber 85 serves as an important protective device for the compressor or blower since the gum forming hydrocarbons which would be detrimental to the operation of this apparatus are thereby filtered out.

The oxygen-containing regenerating gases discharged from compressor or blower 89 pass through line 90 and valve 91 into the flue gas generator or converter 68. In this zone the gases are re-heated to the desired temperature by means of the fuel combustion therein and additional gas is added to the stream if necessary. The gases are then recirculated to the inlet of the reactor as previously described. Substantially constant pressure is usually maintained in the regenerating system by means of vent line 81 containing valve 82.

It should again be emphasized that Figs. 1 and 2 illustrate only two particular embodiments of my invention and that in no manner do I intend to restrict my invention to the two process flows shown. It is obvious that there are numerous arrangements of equipment and types of equipment which may be utilized in catalyst regeneration systems and to which my invention will be a useful and important addition.

I claim as my invention:

1. In the method of regenerating catalysts by removal of carbonaceous deposits therefrom wherein a catalytic mass is regenerated in situ in the presence of oxygen-containing gases and the effluent gases from the regenerating zone are recirculated, with the addition of extraneous oxygen, to the inlet of said regenerating zone, the improvement which comprises passing the effluent gases from said regenerating zone through an absorption zone containing thermally stable and relatively inert absorptive material whereby heavy hydrocarbons contained in said effluent gases are absorbed.

2. In the method of regenerating catalytic masses by removal of carbonaceous deposits therefrom in the presence of an oxygen-containing gas wherein the effluent gases from the regeneration zone are recirculated, with the addition of a minor portion of oxygen, to the inlet of said regeneration zone, the improvement which comprises first passing the effluent gases from said regeneration zone through an absorption zone, without the addition of extraneous oxygen, wherein heavy hydrocarbons contained in said effluent gases are absorbed on a thermally stable and relatively inert absorbent material and wherein no substantial amount of combustion occurs, and finally recirculating the effluent gases from said absorption zone, with the addition of extraneous oxygen, to the inlet of said regeneration zone.

3. In a hydrocarbon conversion process wherein a catalytic mass is alternately subjected to processing by passing hydrocarbon vapors over said catalytic mass at conversion conditions of temperature and pressure and to regeneration by passing heated oxygen-containing gases over said catalytic mass and recirculating a major portion of the effluent regenerating gases with the addition of a minor portion of oxygen, the improvement which comprises passing the effluent gases from the regeneration zone through an absorption zone containing thermally stable and relatively inert absorptive material wherein heavy hydrocarbons present in said effluent gases are absorbed prior to the addition of extraneous oxygen and prior to the recirculation of said effluent regenerating gases.

4. A process for regenerating catalytic masses having deposited thereon hydrocarbonaceous material comprising burning and purging of said hydrocarbonaceous deposit with a mixture of air and products of combustion, passing the effluent gases from the burning and purging zone through an absorption zone containing thermally stable and relatively inert absorptive material wherein heavy hydrocarbons contained in said effluent gases are absorbed and wherein no substantial amount of combustion occurs, and returning a major portion of the effluent gases from said absorption zone to said burning and purging zone with the addition of a controlled minor portion of air.

5. The process of claim 4 wherein said absorption zone is by-passed from the regenerating system during that portion of the regeneration period when the effluent gases from said burning and purging zone contain appreciable quantities of oxygen thereby avoiding any substantial amount of combustion in said absorption zone.

6. The process of claim 4 further characterized in that a substantial amount of heat is removed from the effluent gases from said burning and purging zone before the introduction of said gases into said absorption zone.

LOUIS S. KASSEL.